(12) United States Patent
Zouza et al.

(10) Patent No.: US 11,408,754 B2
(45) Date of Patent: Aug. 9, 2022

(54) ROTATION ANGLE DETECTION APPARATUS

(71) Applicant: JTEKT CORPORATION, Osaka (JP)

(72) Inventors: Shouta Zouza, Toyota (JP); Yuuki Nakashima, Okazaki (JP); Yuji Fujita, Okazaki (JP); Toshihiro Takahashi, Nishio (JP); Xavier Palandre, Grezieu-la-Varenne (FR)

(73) Assignee: JTEKT CORPORATION, Osaka (JP)

( * ) Notice: Subject to any disclaimer, the term of this patent is extended or adjusted under 35 U.S.C. 154(b) by 48 days.

(21) Appl. No.: 16/861,555

(22) Filed: Apr. 29, 2020

(65) Prior Publication Data

US 2020/0363237 A1 Nov. 19, 2020

(30) Foreign Application Priority Data

May 14, 2019 (JP) .............................. JP2019-091638

(51) Int. Cl.
*G01D 5/16* (2006.01)
(52) U.S. Cl.
CPC ...................................... *G01D 5/16* (2013.01)
(58) Field of Classification Search
CPC ...................................................... G01D 5/16
See application file for complete search history.

(56) References Cited

U.S. PATENT DOCUMENTS

| 7,200,515 | B2* | 4/2007 | Sakabe | B62D 15/0215 |
| | | | | 180/444 |
| 7,358,719 | B2* | 4/2008 | Kondo | G01D 5/145 |
| | | | | 324/207.25 |
| 2009/0105909 | A1* | 4/2009 | Yamaguchi | B62D 15/0245 |
| | | | | 701/41 |
| 2016/0229445 | A1 | 8/2016 | Sasaki et al. | |
| 2018/0259367 | A1* | 9/2018 | Klimenko | G01D 5/24476 |

FOREIGN PATENT DOCUMENTS

| EP | 1849683 A1 | 10/2007 |
| JP | 2015-058911 A | 3/2015 |

OTHER PUBLICATIONS

Oct. 12, 2020 Search Report issued in European Patent Application No. 20173188.2.

* cited by examiner

*Primary Examiner* — Walter L Lindsay, Jr.
*Assistant Examiner* — Milton Gonzalez
(74) *Attorney, Agent, or Firm* — Oliff PLC (57) ABSTRACT

A rotation angle detection apparatus includes a driving gear, two driven gears, two sensors, and an arithmetic circuit. The two driven gears have different numbers of teeth and each are in mesh with the driving gear. The arithmetic circuit is configured to compute a rotation angle of the driving gear based on the rotation angles of the two driven gears, detected through the two sensors. The arithmetic circuit is configured to, when a relationship between the rotation angles of the two driven gears, detected through the two sensors, is different from the relationship when the rotation angle of the driving gear, computed by the arithmetic circuit, is normal, detect an abnormality in the rotation angle of the driving gear, computed by the arithmetic circuit.

2 Claims, 9 Drawing Sheets

| CLASSI-FICATION NUMBER TN | ALLOWABLE RANGE OF DIFFERENCE $\Delta\alpha\beta$ | IDEAL VALUE OF DIFFERENCE $\Delta\alpha\beta$ | PERIOD NUMBER $\gamma_1$ |
|---|---|---|---|
| 1 | $-4320\pm\varepsilon$ | $-4320$ | 0 |
| 2 | $-3960\pm\varepsilon$ | $-3960$ | $-1$ |
| 3 | $-3600\pm\varepsilon$ | $-3600$ | $-2$ |
| 4 | $-3240\pm\varepsilon$ | $-3240$ | $-3$ |
| 5 | $-2880\pm\varepsilon$ | $-2880$ | $-4$ |
| 6 | $-2520\pm\varepsilon$ | $-2520$ | $-5$ |
| 7 | $-2160\pm\varepsilon$ | $-2160$ | $-6$ |
| 8 | $-1800\pm\varepsilon$ | $-1800$ | 5 |
| 9 | $-1440\pm\varepsilon$ | $-1440$ | 4 |
| 10 | $-1080\pm\varepsilon$ | $-1080$ | 3 |
| 11 | $-720\pm\varepsilon$ | $-720$ | 2 |
| 12 | $-360\pm\varepsilon$ | $-360$ | 1 |
| 13 | $0\pm\varepsilon$ | 0 | 0 |
| 14 | $360\pm\varepsilon$ | 360 | $-1$ |
| 15 | $720\pm\varepsilon$ | 720 | $-2$ |
| 16 | $1080\pm\varepsilon$ | 1080 | $-3$ |
| 17 | $1440\pm\varepsilon$ | 1440 | $-4$ |
| 18 | $1800\pm\varepsilon$ | 1800 | $-5$ |
| 19 | $2160\pm\varepsilon$ | 2160 | $-6$ |
| 20 | $2520\pm\varepsilon$ | 2520 | 5 |
| 21 | $2880\pm\varepsilon$ | 2880 | 4 |
| 22 | $3240\pm\varepsilon$ | 3240 | 3 |
| 23 | $3600\pm\varepsilon$ | 3600 | 2 |
| 24 | $3960\pm\varepsilon$ | 3960 | 1 |
| 25 | $4320\pm\varepsilon$ | 4320 | 0 |
| 26 | $4680\pm\varepsilon$ | 4680 | $-1$ |
| 27 | $5040\pm\varepsilon$ | 5040 | $-2$ |

ROTATION ANGLE DETECTION APPARATUS

CROSS-REFERENCE TO RELATED APPLICATION

This application claims priority to Japanese Patent Application No. 2019-091638 filed on May 14, 2019, incorporated herein by reference in its entirety.

BACKGROUND

1. Technical Field

The present disclosure relates to a rotation angle detection apparatus.

2. Description of Related Art

There is an electric power steering (EPS) apparatus that applies the torque of a motor to a steering mechanism of a vehicle as an assisting force. A controller of the EPS controls the motor based on a steering torque, a steering angle, and the like. For example, an EPS of Japanese Unexamined Patent Application Publication No. 2015-058911 (JP 2015-058911 A) includes two steering torque sensors, that is, a main steering torque sensor and a sub-steering torque sensor, two steering angle sensors, that is, a main steering angle sensor and a sub-steering angle sensor, and two motor rotation angle sensors, that is a main motor rotation angle sensor and a sub-motor rotation angle sensor, from the viewpoint of ensuring the reliability of the operation of the EPS. A controller of the EPS has a function to detect abnormalities in these sensors.

The controller, for example, detects abnormalities in the steering angle sensors as follows. The controller computes two steering angle computation signals based on two motor rotation angle signals and detects an abnormality in a steering angle detection signal that is generated by the main steering angle sensor or the sub-steering angle sensor by making a comparison among the two steering angle computation signals and the two steering angle detection signals that are generated by the two steering angle sensors. The controller also detects abnormalities in the steering torque sensors or the motor rotation angle sensors by using detection signals of those sensors as in the case of the steering angle sensors.

SUMMARY

The method of detecting abnormalities in sensors, described in JP 2015-058911 A, assumes that an EPS includes multiple sensors of the same type. Depending on product specifications or other factors, a steering angle sensor alone can be required to detect an abnormality in a steering angle detection signal that is generated by the steering angle sensor and, by extension, a steering angle that is detected by the steering angle sensor.

The present disclosure provides a rotation angle detection apparatus that is able to detect an abnormality of a rotation angle.

A rotation angle detection apparatus according to an aspect of the present disclosure includes a driving gear, two driven gears, two sensors, and an arithmetic circuit. The driving gear is configured to rotate integrally with a component whose rotation is to be detected. The two driven gears have different numbers of teeth and each are in mesh with the driving gear. The two sensors each are configured to detect a rotation angle of an associated one of the two driven gears. The arithmetic circuit is configured to compute a rotation angle of the driving gear based on the rotation angles of the two driven gears, detected through the two sensors. The arithmetic circuit is configured to, when a relationship between the rotation angles of the two driven gears, detected through the two sensors, is different from the relationship when the rotation angle of the driving gear, computed by the arithmetic circuit, is normal, detect an abnormality in the rotation angle of the driving gear, computed by the arithmetic circuit.

For example, when there occurs an abnormality in the rotation angles of the two driven gears, detected through the two sensors, the relationship between the rotation angles of the two driven gears is different from the relationship when the rotation angle of the driving gear, computed by the arithmetic circuit, is normal. When there occurs an abnormality in the rotation angles of the two driven gears, detected through the two sensors, the rotation angle of the driving gear, computed based on the rotation angles of the two driven gears, is, of course, different from a normal value. For this reason, with the rotation angle detection apparatus according to the aspect of the present disclosure, on the condition that the relationship between the rotation angles of the two driven gears, detected through the two sensors, is different from the relationship when the rotation angle of the driving gear, computed by the arithmetic circuit, is normal, an abnormality in the rotation angle of the driving gear, computed by the arithmetic circuit, is detected.

In the rotation angle detection apparatus according to the aspect of the present disclosure, the arithmetic circuit may be configured to detect an abnormality in the rotation angle of the driving gear based on a difference between the rotation angles of the two driven gears, computed as a value indicating the relationship between the rotation angles of the two driven gears, and an ideal difference between the rotation angles of the two driven gears.

For example, when there occurs an abnormality in the rotation angles of the two driven gears, detected through the two sensors, the difference between the rotation angles of these two driven gears also indicates an abnormal value. For this reason, with the rotation angle detection apparatus according to the aspect of the present disclosure, an abnormality in the rotation angle of the driving gear is detected based on the difference between the rotation angles of the two driven gears, detected through the two sensors, and the ideal difference between the rotation angles of the two driven gears, detected through the two sensors.

In the rotation angle detection apparatus according to the aspect of the present disclosure, the arithmetic circuit may be configured to detect an abnormality in the rotation angle of the driving gear based on a difference between rotation amounts of the two driven gears, computed as a value indicating the relationship between the rotation angles of the two driven gears, and an ideal difference between the rotation amounts of the two driven gears.

For example, when there occurs an abnormality in the rotation angles of the two driven gears, detected through the two sensors, the difference between the rotation amounts of the two driven gears also indicates an abnormal value. For this reason, with the rotation angle detection apparatus according to the aspect of the present disclosure, an abnormality in the rotation angle of the driving gear is detected based on the difference between the rotation amounts of the two driven gears, detected through the two sensors, and the ideal difference between the rotation amounts of the two driven gears, detected through the two sensors.

In the rotation angle detection apparatus according to the aspect of the present disclosure, the arithmetic circuit may be configured to detect an abnormality in the rotation angle of the driving gear based on a difference between integrated values of rotation amounts of the two driven gears, computed as a value indicating the relationship between the rotation angles of the two driven gears, and an ideal difference between the integrated values of the rotation amounts of the two driven gears.

For example, when there occurs an abnormality in the rotation angles of the two driven gears, detected through the two sensors, the difference between the integrated values of the rotation amounts of the two driven gears also indicates an abnormal value. For this reason, with the rotation angle detection apparatus according to the aspect of the present disclosure, an abnormality in the rotation angle of the driving gear is detected based on the difference between the integrated values of the rotation amounts of the two driven gears, detected through the two sensors, and the ideal difference between the integrated values of the rotation amounts of the two driven gears, detected through the two sensors.

In the rotation angle detection apparatus according to the aspect of the present disclosure, the arithmetic circuit may be configured to, when the difference falls outside an allowable range that is set based on the ideal difference, detect an abnormality in the rotation angle of the driving gear.

With the rotation angle detection apparatus according to the aspect of the present disclosure, an abnormality in the rotation angle of the driving gear is not excessively detected. Depending on how an allowable range is set, an abnormality in the rotation angle of the driving gear is further appropriately detected.

In the rotation angle detection apparatus according to the aspect of the present disclosure, the component whose rotation is to be detected may be one of a steering shaft and a pinion shaft in a steering system of a vehicle.

With the rotation angle detection apparatus according to the aspect of the present disclosure, an abnormality in rotation angle is detected.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
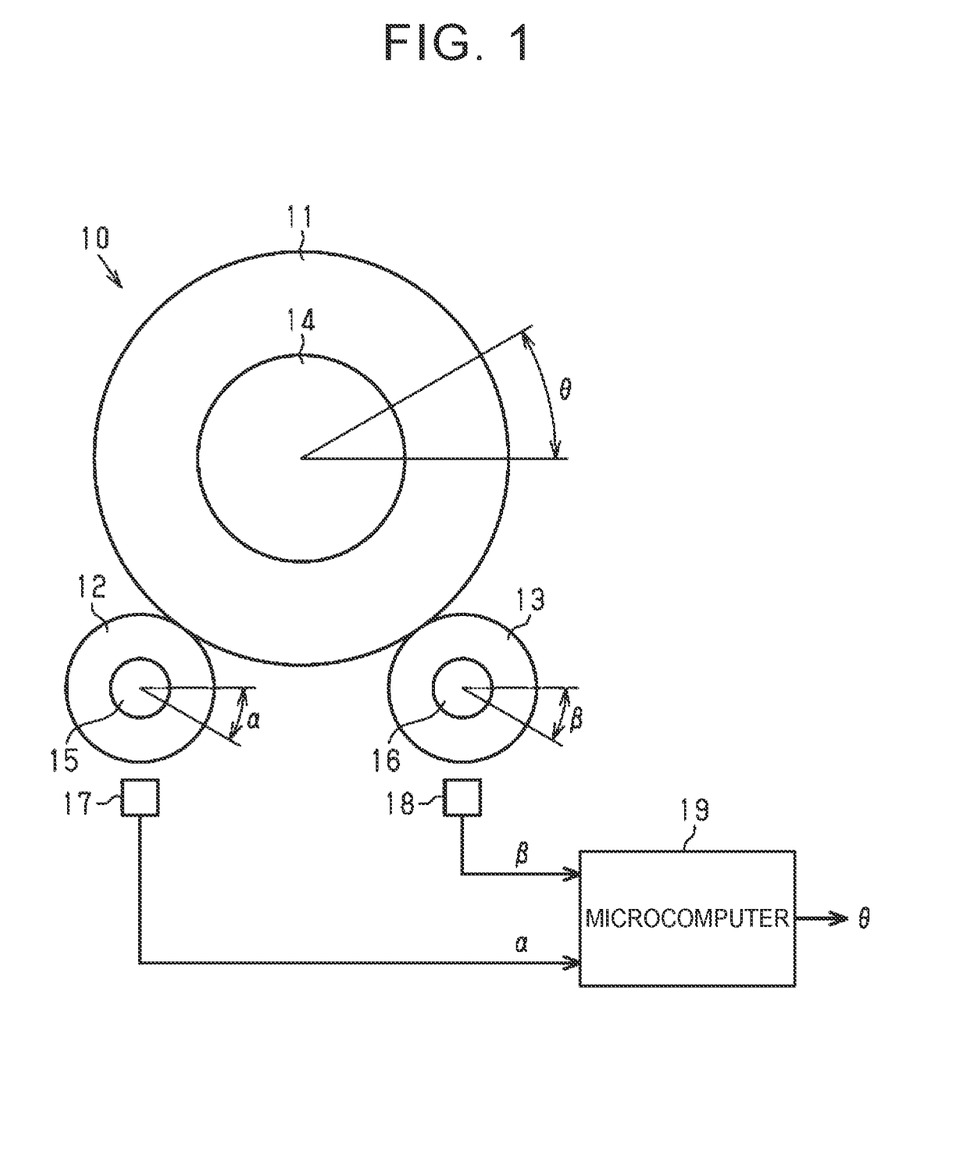
FIG. 1 is a block diagram that shows the schematic configuration of a first embodiment of a rotation angle detection apparatus.

Hereinafter, a first embodiment of a rotation angle detection apparatus will be described. As shown in FIG. 1, the rotation angle detection apparatus 10 includes a driving gear 11, a first driven gear 12, and a second driven gear 13. The driving gear 11, the first driven gear 12, and the second driven gear 13 are made of a synthetic resin material. The driving gear 11 is fitted to a shaft 14 so as to be rotatable integrally with the shaft 14. The shaft 14 is a component to be detected. The first driven gear 12 and the second driven gear 13 each are in mesh with the driving gear 11. The number of teeth of the first driven gear 12 and the number of teeth of the second driven gear 13 are different from each other. For this reason, when the driving gear 11 rotates with the rotation of the shaft 14, a rotation angle $\alpha$ of the first driven gear 12 and a rotation angle $\beta$ of the second driven gear 13 for a rotation angle $\theta$ of the driving gear 11 are different from each other. For example, where the number of teeth of the driving gear 11 is "z", the number of teeth of the first driven gear 12 is "m", and the number of teeth of the second driven gear 13 is "n", when the driving gear 11 makes one revolution, the first driven gear 12 makes "z/m" revolutions, and the second driven gear 13 makes "z/n" revolutions.

The rotation angle detection apparatus 10 includes a first magnet 15, a second magnet 16, a first magnetic sensor 17, a second magnetic sensor 18, and a microcomputer 19 that serves as an arithmetic circuit. The first magnet 15 is provided so as to be integrally rotatable with the first driven gear 12. The second magnet 16 is provided so as to be integrally rotatable with the second driven gear 13. The first magnetic sensor 17 is provided near the first magnet 15 and detects a magnetic field that is emitted from the first magnet 15. The second magnetic sensor 18 is provided near the second magnet 16 and detects a magnetic field that is emitted from the second magnet 16.

For example, an MR sensor made up of four bridge-connected magnetoresistive elements is employed as each of the first magnetic sensor 17 and the second magnetic sensor 18. The resistance value of a magnetoresistive element varies according to the direction of a magnetic field applied. The first magnetic sensor 17 detects the rotation angle $\alpha$ of the first driven gear 12 based on a change in the direction of magnetic flux that is emitted from the first magnet 15. The second magnetic sensor 18 detects the rotation angle $\beta$ of the second driven gear 13 based on a change in the direction of magnetic flux that is emitted from the second magnet 16. Specifically, the first magnetic sensor 17 and the second magnetic sensor 18 are configured as follows.

The first magnetic sensor 17 generates a first sine signal and a first cosine signal that are two analog signals varying continuously with the rotation angle α of the first driven gear 12. A period of each of the first sine signal and the first cosine signal passes when the first driven gear 12 rotates a detection range Ω of the first magnetic sensor 17, that is, when the driving gear 11 makes "(m/z)Ω" revolutions. The phase of the first cosine signal is shifted by ¼ periods from that of the first sine signal. The first magnetic sensor 17 obtains the rotation angle α of the first driven gear 12 in the detection range (one period) Ω of the first magnetic sensor 17 by computing an arc tangent based on the first sine signal and the first cosine signal.

The second magnetic sensor 18 generates a second sine signal and a second cosine signal that are two analog signals varying continuously with the rotation angle β of the second driven gear 13. A period of each of the second sine signal and the second cosine signal passes when the second driven gear 13 rotates a detection range Ω of the second magnetic sensor 18, that is, when the driving gear 11 makes "(n/z)Ω" revolutions. The phase of the second cosine signal is shifted by ¼ periods from that of the second sine signal. The second magnetic sensor 18 obtains the rotation angle β of the second driven gear 13 in the detection range (one period) Ω of the second magnetic sensor 18 by computing an arc tangent based on the second sine signal and the second cosine signal.

Figure 3:
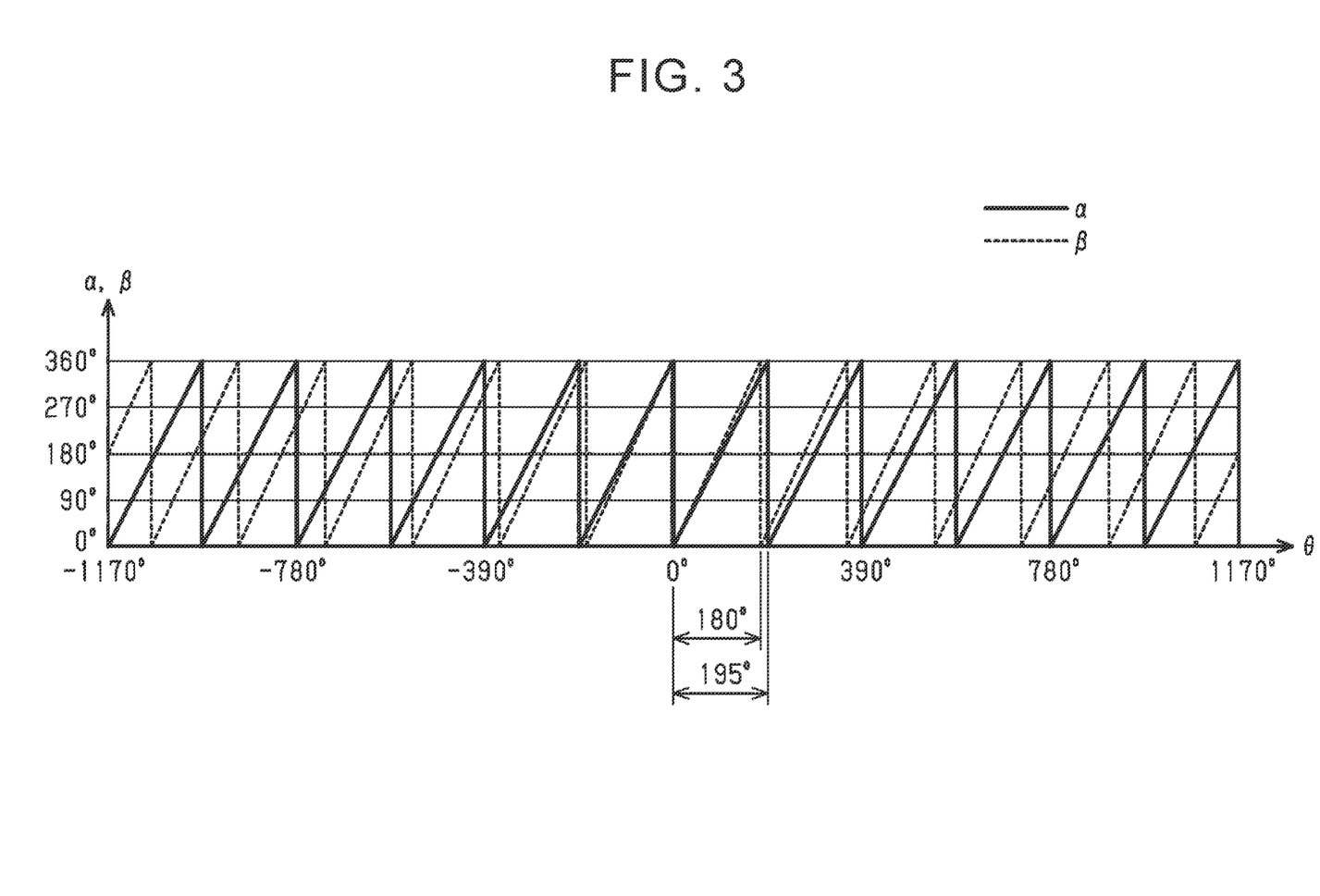
FIG. 3 is a graph that shows the relationship between a rotation angle of a first driven gear and a rotation angle of a driving gear and the relationship between a rotation angle of a second driven gear and a rotation angle of the driving gear in the first embodiment.

The rotation angle α of the first driven gear 12 and the rotation angle θ of the second driven gear 13 for a change in the rotation angle θ of the driving gear 11 vary as shown in the graph of FIG. 3. In the graph of FIG. 3, the abscissa axis represents the rotation angle θ of the driving gear 11. In the graph of FIG. 3, the ordinate axis represents the rotation angle α of the first driven gear 12 and the rotation angle β of the second driven gear 13.

As shown in the graph of FIG. 3, with a change in the rotation angle θ of the driving gear 11, the rotation angle α of the first driven gear 12 changes in rising and falling alternately at a predetermined period according to the number of teeth m. Specifically, the rotation angle α changes in rising and falling alternately each time the first driven gear 12 rotates the detection range Ω of the first magnetic sensor 17, in other words, each time the driving gear 11 makes "mΩ/z" revolutions. The rotation angle β of the second driven gear 13 changes in rising and falling alternately at a predetermined period according to the number of teeth n of the second driven gear 13. Specifically, the rotation angle β changes in rising and falling alternately each time the second driven gear 13 rotates the detection range Ω of the second magnetic sensor 18, in other words, each time the driving gear 11 makes "nΩ/z" revolutions.

Here, as an example, the case where the number of teeth z of the driving gear 11 is "48", the number of teeth m of the first driven gear 12 is "26", the number of teeth n of the second driven gear 13 is "24", and the detection range Ω of each of the first magnetic sensor 17 and the second magnetic sensor 18 is 360° will be discussed. In this case, the rotation angle α of the first driven gear 12 changes in rising and falling alternately each time the driving gear 11 rotates 195°. The rotation angle β of the second driven gear 13 changes in rising and falling alternately each time the driving gear 11 rotates 180°.

The phase difference between the rotation angle α of the first driven gear 12 and the rotation angle β of the second driven gear 13 in the detection range Ω of each of the first magnetic sensor 17 and the second magnetic sensor 18 disappears when the rotation angle θ of the driving gear 11 reaches a predetermined value. Therefore, a computation range (computable range) of the rotation angle θ of multiple revolutions, exceeding 360°, of the driving gear 11 is determined by the ratio among the number of teeth m of the first driven gear 12, the number of teeth n of the second driven gear 13, and the number of teeth z of the driving gear 11. A computation range Ra for the rotation angle θ of the driving gear 11 is expressed by, for example, the following mathematical expression (A).

$$Ra = mn\Omega/z(m-n) \qquad (A)$$

"m" is the number of teeth of the first driven gear 12, "n" is the number of teeth of the second driven gear 13, and "z" is the number of teeth of the driving gear 11. "Ω" is the detection range of each of the first magnetic sensor 17 and the second magnetic sensor 18.

As in the case of the above, where the number of teeth z of the driving gear 11 is "48", the number of teeth m of the first driven gear 12 is "26", the number of teeth n of the second driven gear 13 is "24", and the detection range Ω of each of the first magnetic sensor 17 and the second magnetic sensor 18 is 360°, the computation range of the rotation angle θ of the driving gear 11 is 2340°.

In the graph of FIG. 3, the middle point of the computation range Ra for the rotation angle θ of the driving gear 11 is set as an origin (Rotation angle θ=0°). Here, the computation range Ra for the rotation angle θ of the driving gear 11 is 2340°, the upper limit of the computation range Ra is +1170°, and the lower limit of the computation range Ra is −1170°. In other words, in this example, the rotation angle θ of the driving gear 11 can be computed in absolute value within the range of −1170° to +1170°. The computation range Ra corresponds to 6.5 revolutions (±3.25 revolutions) of the shaft 14. When the shaft 14 rotates in the forward direction with reference to 0° that is the origin, the rotation angle θ of the driving gear 11 increases in the positive direction; whereas, when the shaft 14 rotates in the reverse direction, the rotation angle θ increases in the negative direction.

The microcomputer 19 computes the rotation angle θ of multiple revolutions, exceeding 360°, of the driving gear 11, that is, the shaft 14, in absolute value by using the rotation angle α of the first driven gear 12, detected by the first magnetic sensor 17, and the rotation angle β of the second driven gear 13, detected by the second magnetic sensor 18.

Figure 2:
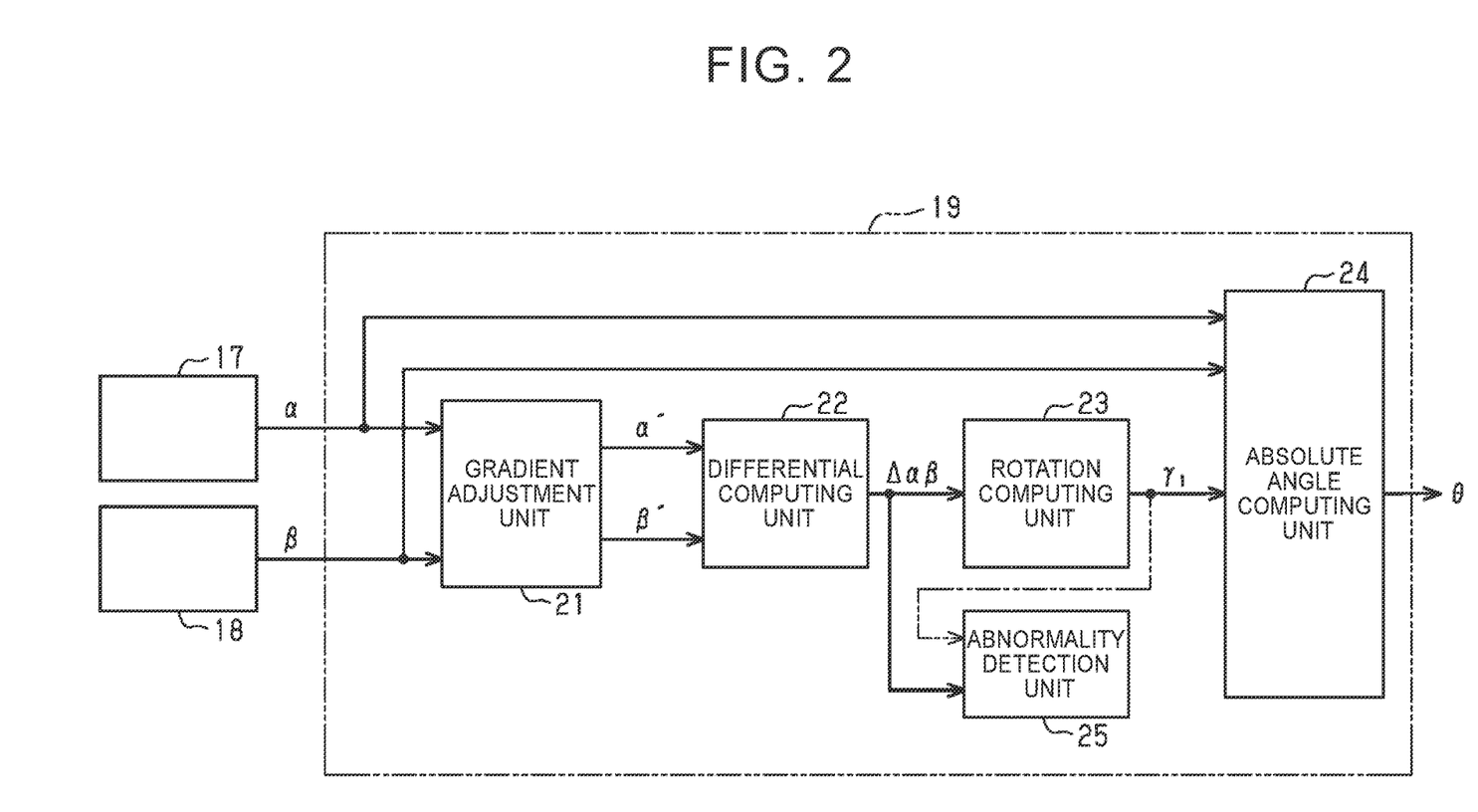
FIG. 2 is a block diagram of a microcomputer of the first embodiment.

Next, the configuration of the microcomputer 19 will be described in detail. As shown in FIG. 2, the microcomputer 19 includes a gradient adjustment unit 21, a differential computing unit 22, a rotation computing unit 23, an absolute angle computing unit 24, and an abnormality detection unit 25.

The gradient adjustment unit 21 adjusts a first gradient and a second gradient such that the first and second gradients become the same value. The first gradient is the ratio of a variation in the rotation angle α of the first driven gear 12 to a variation in the rotation angle θ of the driving gear 11. The second gradient is the ratio of a variation in the rotation angle β of the second driven gear 13 to a variation in the rotation angle θ of the driving gear 11.

The gradient adjustment unit 21, for example, multiples the rotation angle α of the first driven gear 12, detected by the first magnetic sensor 17, by a weight $W_\alpha$ expressed by the following mathematical expression (B1) and multiples the rotation angle β of the second driven gear 13, detected by the second magnetic sensor 18, by a weight $W_\beta$ expressed by the following mathematical expression (B2). Thus, the gradient of the rotation angle α of the first driven gear 12 to the rotation angle θ of the driving gear 11 and the gradient of the rotation angle β of the second driven gear 13 to the rotation angle θ of the driving gear 11 are made equal to each other.

$$W_\alpha = m/LCM_{mn} \quad \text{(B1)}$$

$$W_\beta = n/LCM_{mn} \quad \text{(B2)}$$

"m" is the number of teeth of the first driven gear 12, and "n" is the number of teeth of the second driven gear 13. "$LCM_{mn}$" is the least common multiple of the number of teeth m of the first driven gear 12 and the number of teeth n of the second driven gear 13.

Figure 4:
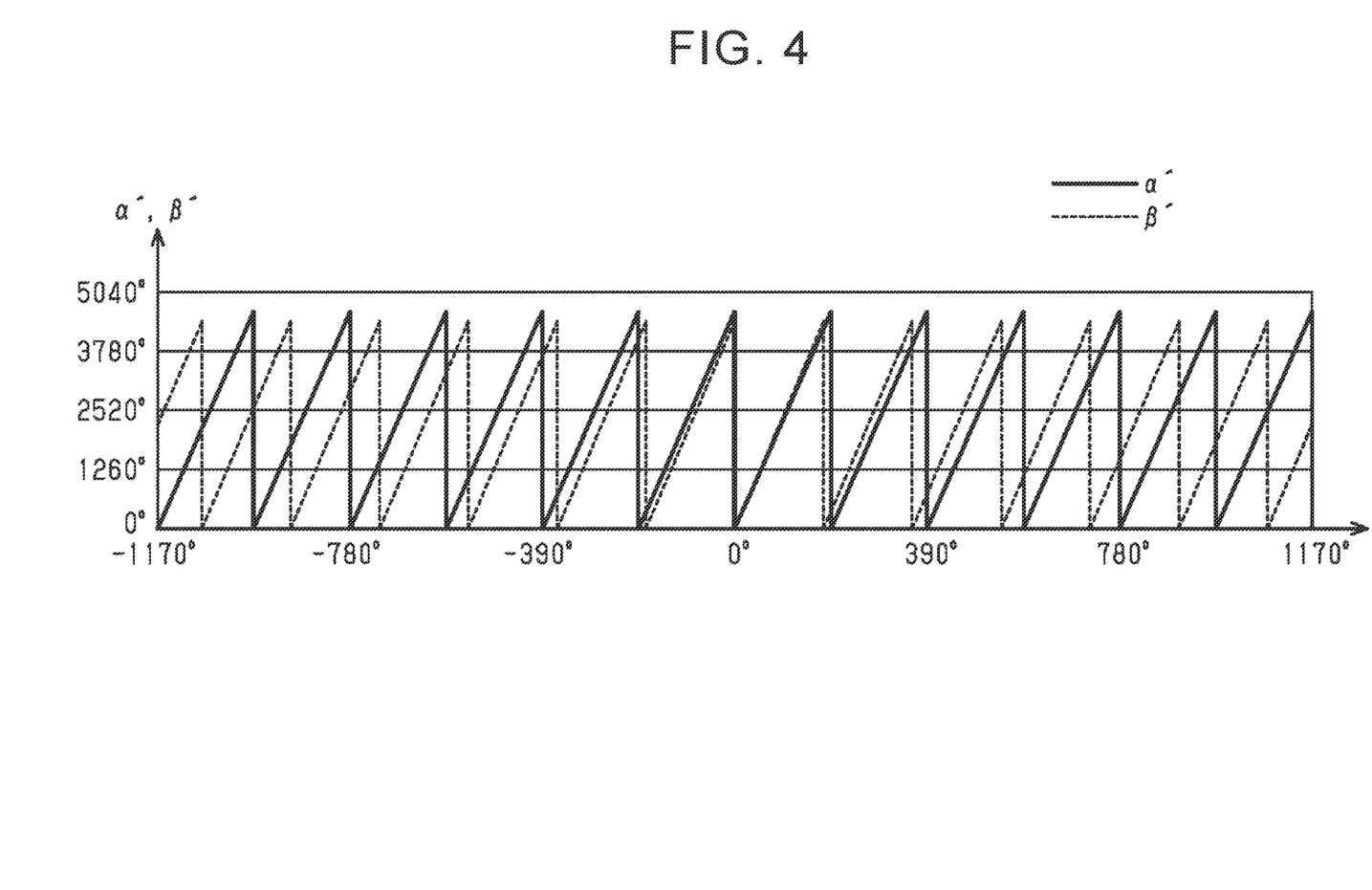
FIG. 4 is a graph that shows the relationship between a gradient-adjusted rotation angle of the first driven gear and a rotation angle of the driving gear and the relationship between a gradient-adjusted rotation angle of the second driven gear and a rotation angle of the driving gear in the first embodiment.

As shown in the graph of FIG. 4, the gradient of a first waveform representing a change in gradient-adjusted rotation angle α' of the first driven gear 12 to a change in the rotation angle θ of the driving gear 11 and the gradient of a second waveform representing a change in gradient-adjusted rotation angle β' of the second driven gear 13 to a change in the rotation angle θ of the driving gear 11 are parallel to each other.

The differential computing unit 22 computes a difference Δαβ between the rotation angle α' of the first driven gear 12 and the rotation angle β' of the second driven gear 13 after the gradients are adjusted by the gradient adjustment unit 21. The relationship between the rotation angle θ of the driving gear 11 and the difference Δαβ is as follows.

Figure 5:
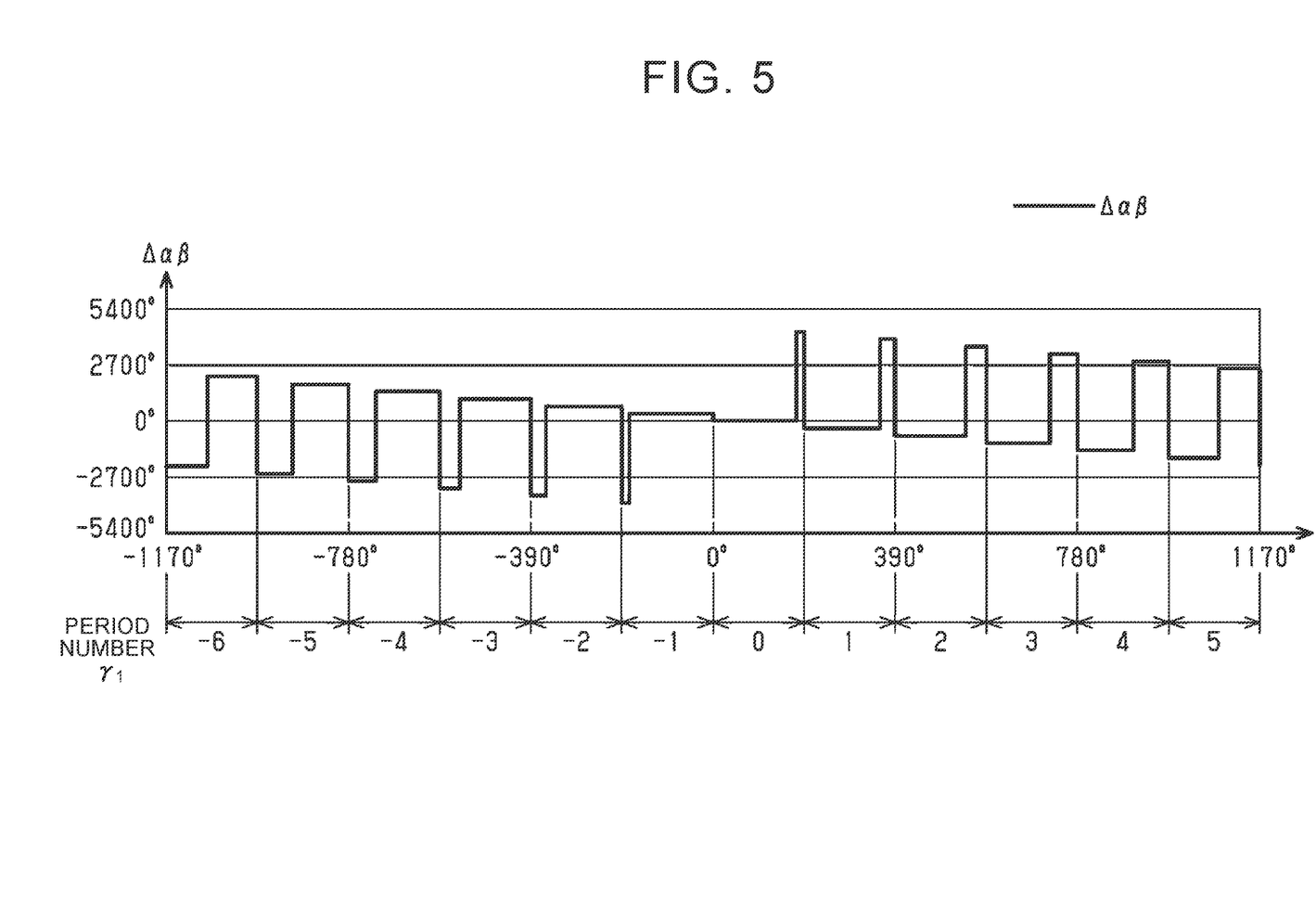
FIG. 5 is a graph that shows the relationship between a rotation angle of the driving gear and a difference between a gradient-adjusted rotation angle of the first driven gear and a gradient-adjusted rotation angle of the second driven gear in the first embodiment.

As shown in the graph of FIG. 5, the value of the difference Δαβ is unique to the rotation angle θ of the driving gear 11 for each period at which the rotation angle α of the first driven gear 12 or the rotation angle α' of the first driven gear 12 after the gradient is adjusted by the gradient adjustment unit 21 changes in rising and falling alternately. In other words, the value of the difference Δαβ is unique to a period number of the rotation angle α of the first driven gear 12 or the rotation angle α' of the first driven gear 12 after the gradient is adjusted by the gradient adjustment unit 21.

The value of the difference Δαβ is unique to the rotation angle θ of the driving gear 11 for each period at which the rotation angle β of the second driven gear 13 or the rotation angle β' of the second driven gear 13 after the gradient is adjusted by the gradient adjustment unit 21 changes in rising and falling alternately. In other words, the value of the difference Δαβ is unique to a period number of the rotation angle θ of the second driven gear 13 or the rotation angle β' of the second driven gear 13 after the gradient is adjusted by the gradient adjustment unit 21.

The rotation computing unit 23 computes a period number $\gamma_1$ of the first driven gear 12 based on the value of the difference Δαβ, computed by the differential computing unit 22. The number of periods $\gamma_1$ means an integer value indicating how many periods has a first sine signal or a first cosine signal generated by the first magnetic sensor 17 passed, that is, how many times has the detection range (one period) of the first magnetic sensor 17 been repeated.

Figure 8:
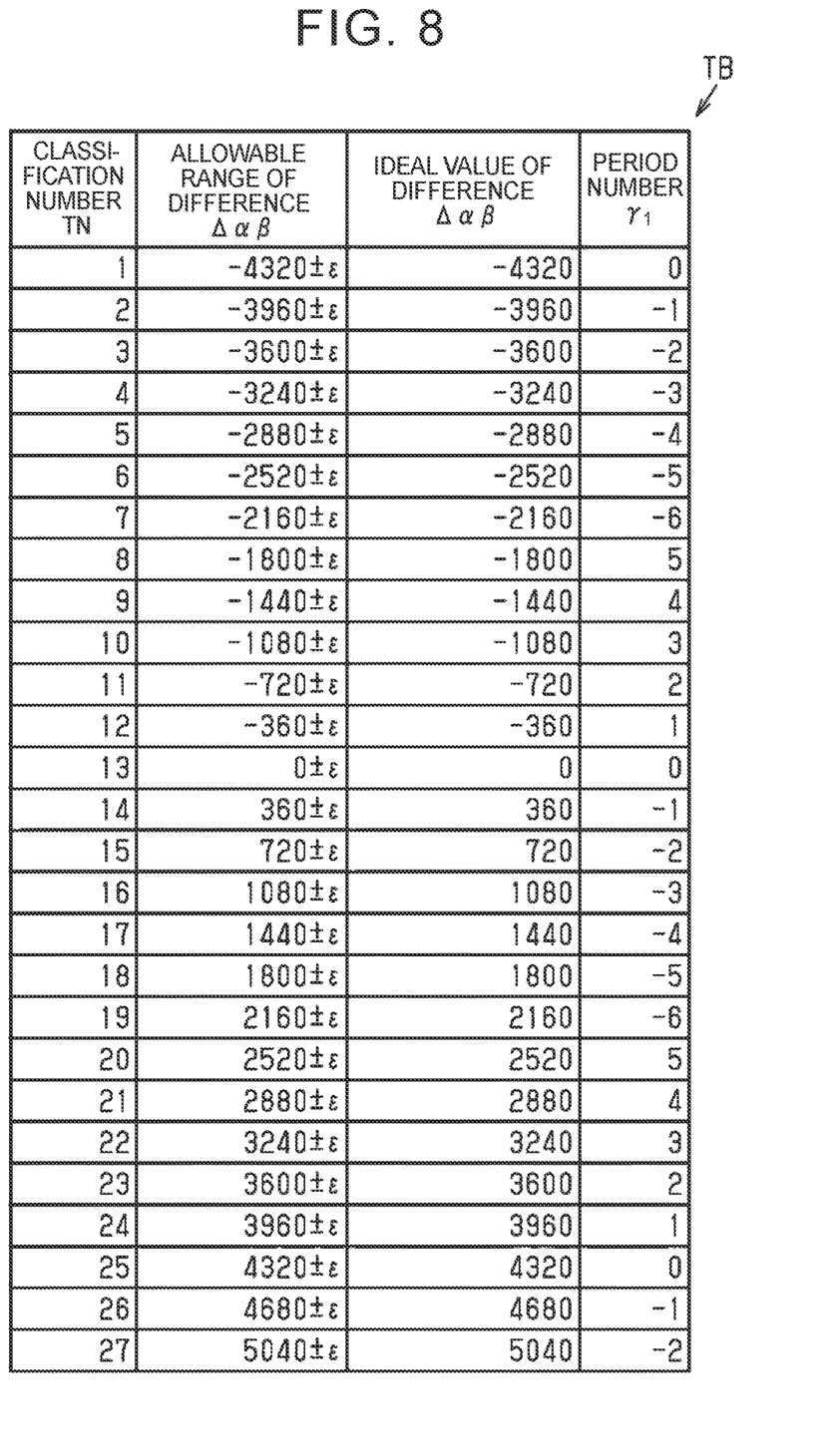
FIG. 8 is a table that is used when the rotation angle of the driving gear is computed in the first embodiment.

The rotation computing unit 23 computes a period number $\gamma_1$ of the first driven gear 12 by consulting a table stored in a storage device (not shown). As shown in FIG. 8, a table TB defines the relationship among three items, that is, an allowable range (described later) of the value of the difference Δαβ between the gradient-adjusted rotation angle α' and the gradient-adjusted rotation angle β', an ideal value of the difference Δαβ, and a period number $\gamma_1$ of the first driven gear 12. In the example of FIG. 8, as indicated by classification numbers TN1, TN2, TN3, TN4, TN5, TN6, TN7, TN8, TN9, TN10, TN11, TN12, TN13, TN14, TN15, TN16, TN17, TN18, TN19, TN20, TN21, TN22, TN23, TN24, TN25, TN26, TN27, the above-described three items are defined for every 360° that is the detection range of the first magnetic sensor 17 in all the computation range for the rotation angle θ of the driving gear 11.

Actually, as the table TB, a table obtained by distributing the above-described three items among the classification numbers TN1, TN2, TN3, TN4, TN5, TN6, TN7, TN8, TN9, TN10, TN11, TN12, TN13, TN14, TN15, TN16, TN17, TN18, TN19, TN20, TN21, TN22, TN23, TN24, TN25, TN26, TN27 for each minimum detection angle (for example, 2°) of the rotation angle α of the first driven gear 12, which is determined according to the resolution of the first magnetic sensor 17, the number of teeth m of the first driven gear 12, and the like, is employed.

The rotation computing unit 23 determines which one of the classification numbers TN1, TN2, TN3, TN4, TN5, TN6, TN7, TN8, TN9, TN10, TN11, TN12, TN13, TN14, TN15, TN16, TN17, TN18, TN19, TN20, TN21, TN22, TN23, TN24, TN25, TN26, TN27, the value of the difference Δαβ computed by the differential computing unit 22 belongs to, and detects a period number $\gamma_1$ of the first driven gear 12, which is associated with the determined classification number. For example, when the value of the difference Δαβ computed by the differential computing unit 22 is "−2160°", the value of the difference Δαβ belongs to the classification number TN7, so it is found that the period number $\gamma_1$ of the first driven gear 12 is "−6".

The absolute angle computing unit 24 computes the rotation angle θ of the driving gear 11 in absolute angle based on the rotation angle α of the first driven gear 12, detected by the first magnetic sensor 17, and the period number $\gamma_1$ of the first driven gear 12, computed by the rotation computing unit 23. The rotation angle θ of multiple revolutions, exceeding 360°, of the driving gear 11 is obtained based on, for example, the following mathematical expression (C).

$$\theta = m\alpha/z + (m/z)\omega\gamma_1 \quad \text{(C)}$$

"m" is the number of teeth of the first driven gear 12, "n" is the number of teeth of the second driven gear 13, and "z" is the number of teeth of the driving gear 11. "Ω" is the detection range of each of the first magnetic sensor 17 and the second magnetic sensor 18. "α" is the rotation angle of the first driven gear 12, detected by the first magnetic sensor 17. "mα/z" indicates the rotation angle of the driving gear 11 to the rotation angle α of the first driven gear 12 in the detection range Ω of the first magnetic sensor 17.

Figure 6:
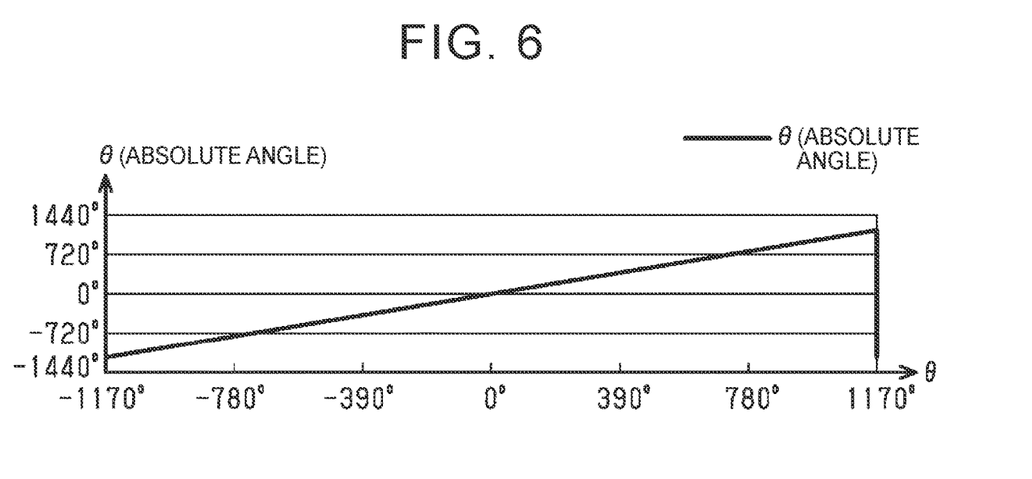
FIG. 6 is a graph that shows the relationship between an actual rotation angle of the driving gear and a rotation angle (absolute value) of the driving gear in the first embodiment.

The relationship between an actual rotation angle θ of the driving gear 11 and the rotation angle θ (absolute angle) of the driving gear 11, computed by the absolute angle computing unit 24, is as shown in the graph of FIG. 6. In the graph of FIG. 6, the abscissa axis represents the actual rotation angle θ of the driving gear 11, and the ordinate axis represents the rotation angle θ (absolute angle) of the driving gear 11, computed by the absolute angle computing unit 24. As shown in the graph of FIG. 6, the rotation angle θ (absolute angle) of the driving gear 11 linearly changes with a change in the actual rotation angle θ of the driving gear 11. Since the actual rotation angle θ of the driving gear 11 and the rotation angle θ (absolute angle) of the driving gear 11 have a linear relationship, the actual rotation angle θ of the driving gear 11 and the rotation angle θ (absolute angle) of the driving gear 11 are in a one-to-one correspondence with each other. In other words, the rotation angle θ (absolute angle) of the driving gear 11, that is, the absolute rotation angle of the shaft 14, is detected immediately.

The abnormality detection unit 25 detects an abnormality in the rotation angle θ (absolute angle) of the driving gear 11, computed by the absolute angle computing unit 24, based on the value of the difference Δαβ between the gradient-adjusted rotation angle α' and the gradient-adjusted rotation angle β', computed by the differential computing unit 22. This is based on the fact that, when the value of the difference Δαβ is abnormal, there is a high probability that the period number $\gamma_1$ of the first driven gear 12, computed based on the value of the difference Δαβ, and, by extension, the rotation angle θ of the driving gear 11, computed based on the period number $\gamma_1$, are also abnormal. When the value of the difference Δαβ falls outside an allowable range determined based on an ideal value that is the value of an ideal difference Δαβ, the abnormality detection unit 25 determines that the rotation angle θ (absolute angle) of the driving gear 11, computed by the absolute angle computing unit 24, is abnormal.

Figure 7:
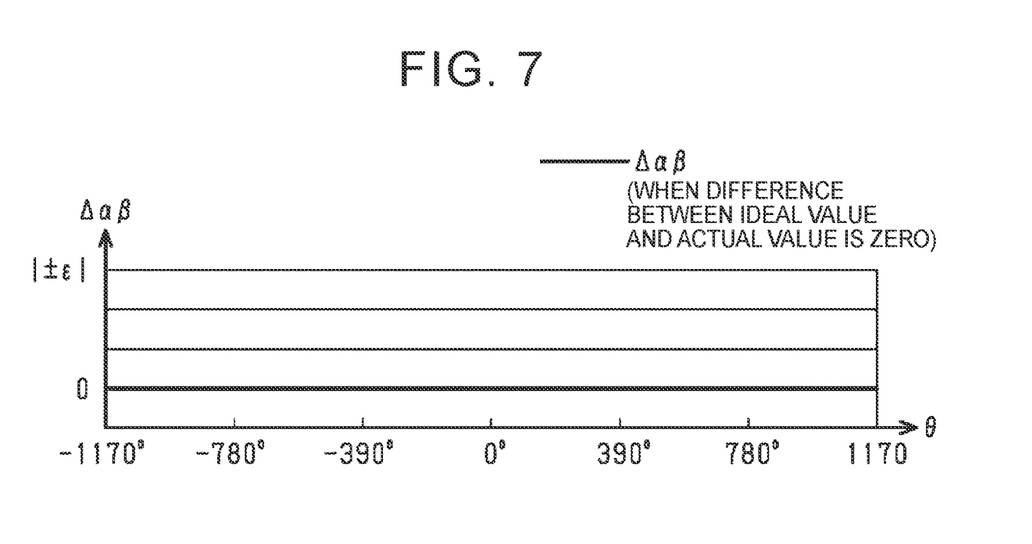
FIG. 7 is a graph that shows an allowable range of the difference between a gradient-adjusted rotation angle of the first driven gear and a gradient-adjusted rotation angle of the second driven gear in the first embodiment.

As shown in the graph of FIG. 7, the allowable range of the difference Δαβ is defined by an upper limit ε and a lower limit −ε. The upper limit ε is set to a positive value with reference to "zero" that is the ideal value of the difference Δαβ. The lower limit −ε is set to a negative value with reference to "zero" that is the ideal value of the difference Δαβ. A method of setting the upper limit ε and the lower limit −ε will be described in detail later.

When the value of the difference Δαβ between the gradient-adjusted rotation angle α' of the first driven gear 12 and the gradient-adjusted rotation angle β' of the second driven gear 13 falls within the range of "±ε" with respect to the ideal value, the abnormality detection unit 25 determines that the rotation angle θ of the driving gear 11, computed by the absolute angle computing unit 24, is normal. When the value of the difference Δαβ between the gradient-adjusted rotation angle α' of the first driven gear 12 and the gradient-adjusted rotation angle β' of the second driven gear 13 falls outside the range of "±ε" with respect to the ideal value, the abnormality detection unit 25 determines that the rotation angle θ of the driving gear 11, computed by the absolute angle computing unit 24, is abnormal.

When an abnormality of the rotation angle θ of the driving gear 11 is detected, a driver, or the like, is prompted by notification of the abnormality to take some measures, such as fixing the rotation angle detection apparatus 10. Alternatively, when an abnormality of the rotation angle θ of the driving gear 11 is detected, the reliability of detection of the rotation angle detection apparatus 10 can be ensured by stopping computation of the rotation angle θ of the driving gear 11 or not using the rotation angle θ computed.

Method of Setting Upper Limit and Lower Limit

Next, a method of setting the upper limit ε and the lower limit −ε will be described. The upper limit ε and the lower limit −ε are obtained based on an ideal value and actual value of the difference Δαβ between the gradient-adjusted rotation angle α' and the gradient-adjusted rotation angle β'. An ideal value $\Delta\alpha\beta_1$ of the difference Δαβ is expressed by the following mathematical expression (D1). An actual value $\Delta\alpha\beta_2$ of the difference Δαβ is expressed by the following mathematical expression (D2).

$$\Delta\alpha\beta_1 = \alpha' \cdot W_\alpha - \beta' \cdot W_\beta \tag{D1}$$

$$\Delta\alpha\beta_2 = \Delta\alpha\beta_1 + \delta_{\alpha\beta} = (\alpha' + \delta_\alpha) \cdot W_\alpha - (\beta' + \delta_\beta) \cdot W_\beta \tag{D2}$$

"α'" is the gradient-adjusted rotation angle of the first driven gear 12, and "β'" is the gradient-adjusted rotation angle of the second driven gear 13. "$W_\alpha$" is a weight that is obtained by using the mathematical expression (B1) and assigned to the rotation angle α of the first driven gear 12, and "$W_\beta$" is a weight that is obtained by using the mathematical expression (B2) and assigned to the rotation angle β of the second driven gear 13.

"$\delta_{\alpha\beta}$" is a maximum allowable tolerance of the ideal value $\Delta\alpha\beta_1$ of the difference Δαβ. "$\delta_\alpha$" is a maximum allowable tolerance in computing the gradient-adjusted rotation angle α' of the first driven gear 12 when the rotation angle detection apparatus 10 is normal. "$\delta_\beta$" is a maximum allowable tolerance in computing the gradient-adjusted rotation angle β' of the second driven gear 13 when the rotation angle detection apparatus 10 is normal.

The tolerance $\delta_\alpha$ contains, for example, mechanical tolerances, such as a backlash and assembly tolerance between the driving gear 11 and the first driven gear 12, and electrical tolerances due to the detection accuracy, temperature characteristics, and the like, of the first magnetic sensor 17. The tolerance $\delta_\beta$ contains, for example, mechanical tolerances, such as a backlash and assembly tolerance between the driving gear 11 and the second driven gear 13, and electrical tolerances due to the detection accuracy, temperature characteristics, and the like, of the second magnetic sensor 18.

Therefore, as expressed by the following mathematical expression (D3), the maximum allowable tolerance $\delta_{\alpha\beta}$ of the ideal value $\Delta\alpha\beta_1$ of the difference Δαβ can be obtained from the mathematical expressions (D1) and (D2).

$$\delta_{\alpha\beta} = \delta_\alpha \cdot W_\alpha - \delta_\beta \cdot W_\beta \tag{D3}$$

In the present embodiment, as expressed by the following mathematical expression (D4), the absolute value of the maximum allowable tolerance $\delta_{\alpha\beta}$ of the ideal value $\Delta\alpha\beta_1$ of the difference Δαβ is set as the absolute value of each of the upper limit ε and the lower limit −ε.

$$|\delta_{\alpha\beta}| = |\pm\varepsilon| \tag{D4}$$

As a result, the allowable range $R_{\alpha\beta}$ of the difference Δαβ is expressed by the following mathematical expression (D5).

$$R_{\alpha\beta} = \Delta\alpha\beta_1 \pm \varepsilon \tag{D5}$$

Advantageous Effects of First Embodiment

According to the first embodiment, the following advantageous effects are obtained.

An abnormality of the rotation angle θ of the driving gear 11, computed by the absolute angle computing unit 24, is detected based on the value of the difference Δαβ between the gradient-adjusted rotation angle α' of the first driven gear 12 and the gradient-adjusted rotation angle β' of the second driven gear 13. This is based on the fact that, when the value of the difference Δαβ is abnormal, there is a high probability that the period number $\gamma_1$ of the first driven gear 12, computed based on the value of the difference Δαβ, and, by extension, the rotation angle θ of the driving gear 11, computed based on the period number $\gamma_1$, are also abnormal.

The abnormality detection unit 25 detects an abnormality of the rotation angle θ of the driving gear 11, computed by the absolute angle computing unit 24, when the value of the difference Δαβ, computed by the differential computing unit 22, falls outside the allowable range determined based on the ideal value of the difference Δαβ. Therefore, an abnormality of the rotation angle θ of the driving gear 11 is not excessively determined.

For example, when it is determined whether the rotation angle θ of the driving gear 11 is abnormal merely based on a comparison between the value of the difference Δαβ and the ideal value of the difference Δαβ, there are the following concerns. In other words, the value of the difference Δαβ can be different from an ideal value because of dimensional tolerances of the first driven gear 12 and second driven gear 13, and the like; however, there are concerns that the rotation angle θ of the driving gear 11 is determined to be abnormal even in such a case. For this reason, whether the rotation angle θ of the driving gear 11 is abnormal is desirably determined based on whether the value of the difference Δαβ falls within the allowable range determined based on the ideal value. In the present embodiment, the allowable range of the value of the difference Δαβ is set based on the maximum allowable tolerance according to product specifications, and the like, so an abnormality of the rotation angle θ of the driving gear 11 can be further appropriately detected. In addition, the reliability of the operation of the rotation angle detection apparatus 10 is ensured.

The driving gear 11, the first driven gear 12, and the second driven gear 13 are made of a synthetic resin material. For this reason, abnormal noise resulting from meshing of gears is reduced, while, on the other hand, there are concerns that the first driven gear 12 and the second driven gear 13 may abrade as a result of long-term usage. When the status of meshing of each of the driven gears 12, 13 with the driving gear 11 changes because of such abrasion, there are concerns that the rotation angles α, β of the driven gears, detected by the magnetic sensors 17, 18, and, by extension, the rotation angle θ0 of the driving gear 11, computed based on the rotation angles α, β, indicate abnormal values. Therefore, when the driving gear 11, the first driven gear 12, and the second driven gear 13 are made of a synthetic resin material, it is particularly required to detect an abnormality of the rotation angle θ of the driving gear 11.

The rotation angle detection apparatus 10 does not need to include a special component for detecting an abnormality of the rotation angle θ of the driving gear 11. Therefore, the configuration of the rotation angle detection apparatus 10 does not become complicated.

As shown in the graph of FIG. 5, the value of the difference Δαβ between the gradient-adjusted rotation angle α' of the first driven gear 12 and the gradient-adjusted rotation angle β' of the second driven gear 13 is unique to the rotation angle θ of the driving gear 11 for each period at which the gradient-adjusted rotation angles α', β' change in rising and falling alternately with a change in the rotation angle θ of the driving gear 11. Therefore, the value of the difference Δαβ is suitable for applications to detecting a period number $\gamma_1$ of the first driven gear 12 or a period number $\gamma_2$ of the second driven gear 13 and, by extension, the rotation angle θ of the driving gear 11. As shown in the graph of FIG. 5, the value of the difference Δαβ changes in a rectangular waveform with a change in the rotation angle θ of the driving gear 11. As a result, the abnormality detection unit 25 can easily recognize the value of the difference Δαβ as a pattern and, by extension, can easily compare the value of the difference Δαβ with the ideal value. Hence, the value of the difference Δαβ is suitable for applications to detecting an abnormality of the rotation angle θ of the driving gear 11. The value of the difference between the rotation angles α, β before the gradients are adjusted, for example, linearly changes with a change in the rotation angle θ of the driving gear 11.

Second Embodiment

Next, a second embodiment of a rotation angle detection apparatus will be described. The present embodiment basically has similar components to those of the first embodiment shown in FIG. 1 and FIG. 2. The present embodiment differs from the first embodiment in a method of determining whether the rotation angle θ of the driving gear 11 is abnormal. Therefore, like reference signs denote the same members and components to those of the first embodiment, and the detailed description thereof is omitted.

According to the first embodiment, an abnormality of the rotation angle θ of the driving gear 11 is detected based on whether the value of the difference Δαβ between the gradient-adjusted rotation angle α' of the first driven gear 12 and the gradient-adjusted rotation angle β' of the second driven gear 13 falls outside the allowable range.

However, there are concerns that the following events occur in the rotation angle detection apparatus 10. For example, it is conceivable that so-called tooth jumping occurs in meshing between the driving gear 11 and the first driven gear 12 or meshing between the driving gear 11 and the second driven gear 13. It is also conceivable that a so-called offset error, that is, abnormal values different from actual values are computed as the rotation angles α, β of the driven gears 12, 13, occurs as a result of an abnormality of the magnetic sensors 17, 18, or the like. Then, it is presumable that the value of the difference Δαβ significantly deviates from the allowable range associated with the original number of periods $\gamma_1$ and, as a result, falls within an allowable range associated with another number of periods $\gamma_1$ different from the original one.

For example, as shown in FIG. 8, when the value of the difference Δαβ is erroneously computed as "360" because of an abnormality in the rotation angle detection apparatus 10 although the value of the difference Δαβ is originally "zero", the rotation computing unit 23 erroneously recognizes the period number $\gamma_1$ as "−1" although the original number of periods $\gamma_1$ is "zero". In this case, "360" that is the erroneously recognized value of the difference Δαβ falls within the allowable range of the difference Δαβ at the time when the period number $\gamma_1$ is "−1, so the abnormality detection unit 25 is difficult to detect the abnormality. In the present embodiment, the microcomputer 19 employs the following components.

Figure 9:
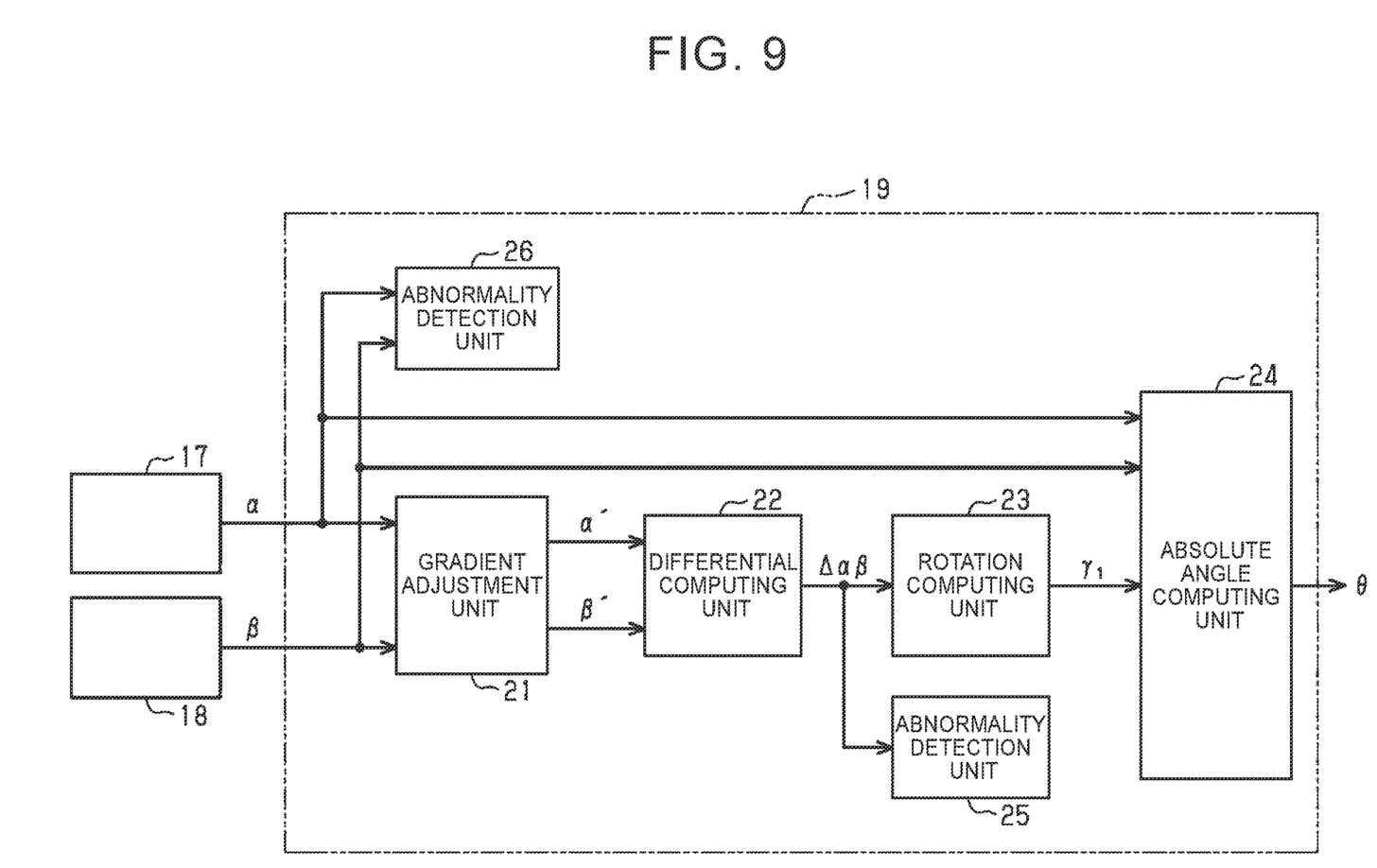
FIG. 9 is a block diagram of a microcomputer of a second embodiment.

As shown in FIG. 9, the microcomputer 19 includes another abnormality detection unit 26 in addition to the abnormality detection unit 25. The abnormality detection unit 26 detects an abnormality of the rotation angle θ of the driving gear 11, computed by the absolute angle computing unit 24, based on a rotation amount of the first driven gear 12 and a rotation amount of the second driven gear 13.

Figure 10:
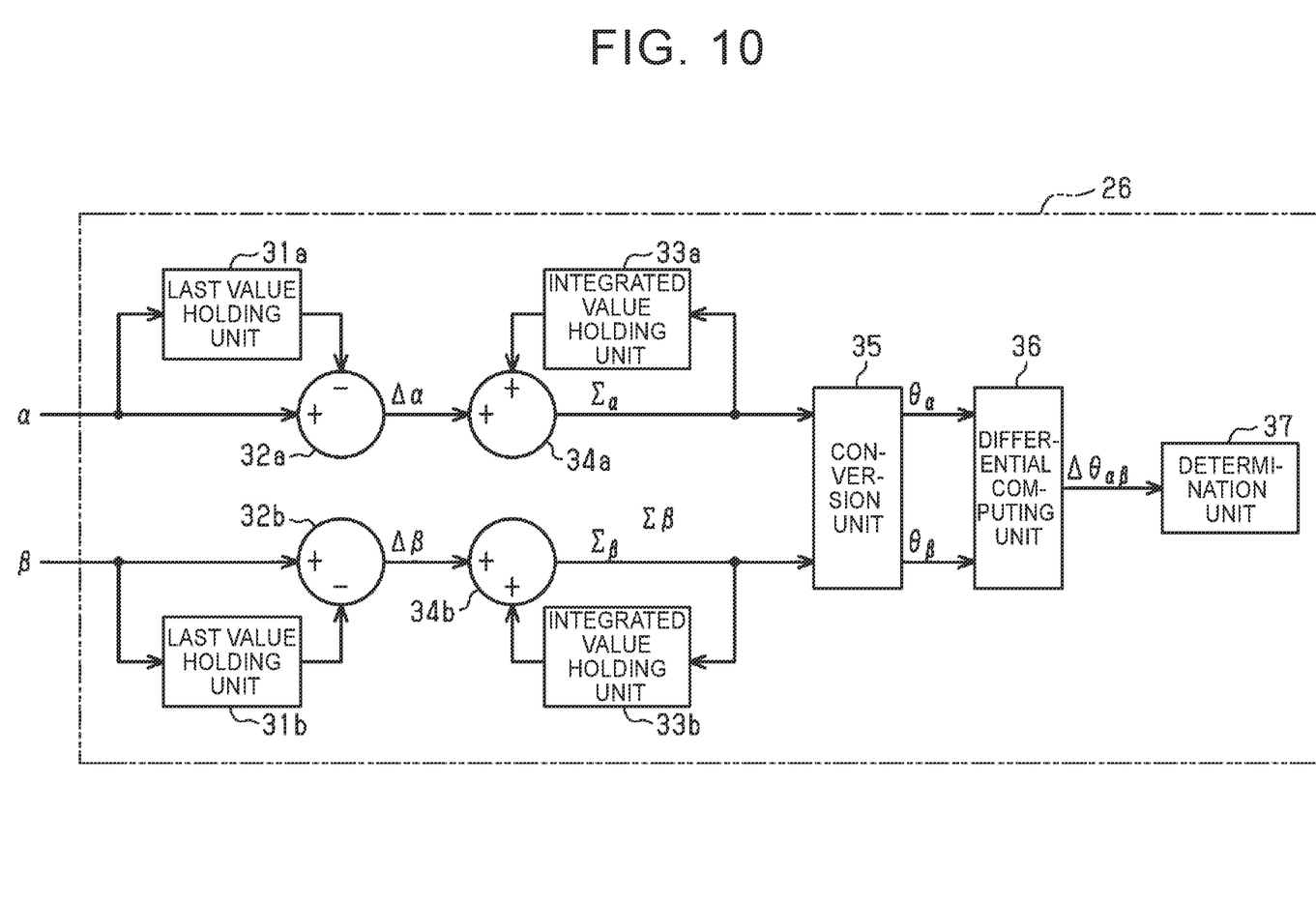
FIG. 10 is a block diagram of an abnormality detection unit of the second embodiment.

As shown in FIG. 10, the abnormality detection unit 26 includes two last value holding units 31a, 31b, two subtractors 32a, 32b, two integrated value holding units 33a, 33b, two adders 34a, 34b, a conversion unit 35, a differential computing unit 36, and a determination unit 37.

The last value holding unit 31a acquires the rotation angle α of the first driven gear 12, computed by the first magnetic sensor 17, and holds the acquired rotation angle α. While the first magnetic sensor 17 computes the rotation angle α at a predetermined computation period, the rotation angle α held in the last value holding unit 31a is updated each time the rotation angle α is computed by the first magnetic sensor 17. In other words, the rotation angle α held in the last value holding unit 31a is a last value (the rotation angle α one computation period before) for the rotation angle α that is a current value to be computed by the first magnetic sensor 17.

The subtractor 32a computes a rotation amount Δα in one computation period of the first driven gear 12 by subtracting the last value of the rotation angle α, held in the last value holding unit 31a, from the current value of the rotation angle α, computed by the first magnetic sensor 17.

The integrated value holding unit 33a acquires an integrated value $\Sigma_\alpha$ computed by the adder 34a (described later) and holds the acquired integrated value $\Sigma_\alpha$. The integrated value $\Sigma_\alpha$ held in the integrated value holding unit 33a is updated each time the integrated value $\Sigma_\alpha$ is computed by the adder 34a. In other words, the integrated value $\Sigma_\alpha$ held in the integrated value holding unit 33a is a last value (the integrated value $\Sigma_\alpha$ one computation period before) for a current value of the integrated value $\Sigma_\alpha$ to be computed by the adder 34a.

The adder 34a computes a current value of the integrated value $\Sigma_\alpha$ by adding the current value of the rotation amount $\Delta\alpha$ in one computation period of the first driven gear 12, computed by the subtractor 32a, and the last value of the integrated value $\Sigma_\alpha$ of the rotation amount $\Delta\alpha$, held in the integrated value holding unit 33a.

The last value holding unit 31b acquires the rotation angle θ of the second driven gear 13, computed by the second magnetic sensor 18, and holds the acquired rotation angle θ. The rotation angle θ held in the last value holding unit 31b is a last value (the rotation angle θ one computation period before) for a current value of the rotation angle θ to be computed by the second magnetic sensor 18.

The subtractor 32b computes a rotation amount $\Delta\beta$ in one computation period of the second driven gear 13 by subtracting the last value of the rotation angle β, held in the last value holding unit 31b, from the current value of the rotation angle β, computed by the second magnetic sensor 18.

The integrated value holding unit 33b acquires an integrated value $\Sigma_\beta$ computed by the adder 34b (described later) and holds the acquired integrated value $\Sigma_\beta$. The integrated value $\Sigma_\beta$ held in the integrated value holding unit 33b is a last value for a current value of the integrated value $\Sigma_\beta$ to be computed by the adder 34b.

The adder 34b computes a current value of the integrated value $\Sigma_\beta$ by adding the current value of the rotation amount $\Delta\beta$ in one computation period of the second driven gear 13, computed by the subtractor 32b, and the last value of the integrated value $\Sigma_\beta$ of the rotation amount $\Delta\beta$, held in the integrated value holding unit 33b.

The conversion unit 35 converts the integrated value $\Sigma_\alpha$ of the rotation amount $\Delta\alpha$, computed by the adder 34a, to a rotation angle $\theta_\alpha$ of the driving gear 11. The conversion unit 35 converts the integrated value $\Sigma_\beta$ of the rotation amount $\Delta\beta$, computed by the adder 34b, to a rotation angle $\theta_\beta$ of the driving gear 11. The converted rotation angles $\theta_\alpha$, $\theta_\beta$ are theoretically the same value.

The conversion unit 35, for example, computes the rotation angle $\theta_\alpha$ of the driving gear 11 by multiplying the integrated value $\Sigma_\alpha$ of the rotation amount $\Delta\alpha$, computed by the adder 34a, by the gear ratio (=z/m) between the driving gear 11 and the first driven gear 12. The conversion unit 35 computes the rotation angle $\theta_\beta$ of the driving gear 11 by multiplying the integrated value $\Sigma_\beta$ of the rotation amount $\Delta\beta$, computed by the adder 34b, by the gear ratio (=z/n) between the driving gear 11 and the second driven gear 13.

The differential computing unit 36 computes a difference $\Delta\theta_{\alpha\beta}$ between the two rotation angles $\theta_\alpha$, $\theta_\beta$ computed by the conversion unit 35. Since the rotation angle $\theta_\alpha$ and the rotation angle $\theta_\beta$ are theoretically the same value, the value of the difference $\Delta\theta_{\alpha\beta}$ is theoretically "zero".

When the value of the difference $\Delta\theta_{\alpha\beta}$ between the two rotation angles $\theta_\alpha$, $\theta_\beta$, computed by the differential computing unit 36, falls outside an allowable range determined based on an ideal value that is the value of an ideal difference $\Delta\theta_{\alpha\beta}$, the determination unit 37 determines that the rotation angle θ of the driving gear 11, computed by the absolute angle computing unit 24, is abnormal.

The allowable range of the difference $\Delta\theta_{\alpha\beta}$ is defined by an upper limit κ and a lower limit −κ. The upper limit κ is set to a positive value with reference to "zero" that is the ideal value of the difference $\Delta\theta_{\alpha\beta}$. The lower limit −κ is set to a negative value with reference to "zero" that is the ideal value of the difference $\Delta\theta_{\alpha\beta}$. A method of setting the upper limit κ and the lower limit −κ will be described in detail later.

The determination unit 37 determines that the rotation angle θ of the driving gear 11, computed by the absolute angle computing unit 24, is normal when the value of the difference $\Delta\theta_{\alpha\beta}$ between the two rotation angles $\theta_\alpha$, $\theta_\beta$, computed by the differential computing unit 36, falls within the range of "±κ" with respect to the ideal value (here, "zero"). The determination unit 37 determines that the rotation angle θ of the driving gear 11, computed by the absolute angle computing unit 24, is abnormal when the value of the difference $\Delta\theta_{\alpha\beta}$ between the two rotation angles $\theta_\alpha$, $\theta_\beta$, computed by the differential computing unit 36, falls outside the range of "±κ" with respect to the ideal value.

Next, a method of setting the upper limit κ and the lower limit −κ will be described. The upper limit κ and the lower limit −κ are obtained based on an ideal value and actual value of the difference $\Delta\theta_{\alpha\beta}$ between the two rotation angles $\theta_\alpha$, $\theta_\beta$, computed by the differential computing unit 36. An ideal value $\Delta\theta_{\alpha\beta 1}$ of the difference $\Delta\theta_{\alpha\beta}$ is expressed by the following mathematical expression (E1). An actual value $\Delta\theta_{\alpha\beta 2}$ of the difference $\Delta\theta_{\alpha\beta}$ is expressed by the following mathematical expression (E2).

$$\Delta\theta_{\alpha\beta 1} = \theta_\alpha \cdot \lambda_1 - \theta_\beta \cdot \lambda_2 = 0 \tag{E1}$$

$$\Delta\theta_{\alpha\beta 2} = (\theta_\alpha + \delta_1) \cdot \lambda_1 - (\theta_\beta + \delta_2) \cdot \lambda_2 = 0 \tag{E2}$$

"$\lambda_1$" is the gear ratio (=z/m) between the driving gear 11 and the first driven gear 12, and "$\lambda_2$" is the gear ratio (=z/n) between the driving gear 11 and the second driven gear 13. "$\delta_1$" is a maximum allowable tolerance of the rotation angle $\theta_\alpha$ computed by the differential computing unit 36 when the rotation angle detection apparatus 10 is normal. "$\delta_2$" is a maximum allowable tolerance of the rotation angle $\theta_\beta$ computed by the differential computing unit 36 when the rotation angle detection apparatus 10 is normal.

The tolerance $\delta_1$ includes, for example, mechanical tolerances, such as a backlash and assembly tolerance between the driving gear 11 and the first driven gear 12, and electrical tolerances due to the detection accuracy, temperature characteristics, and the like, of the first magnetic sensor 17. The tolerance $\delta_2$ includes, for example, mechanical tolerances, such as a backlash and assembly tolerance between the driving gear 11 and the second driven gear 13, and electrical tolerances due to the detection accuracy, temperature characteristics, and the like, of the second magnetic sensor 18.

Therefore, as expressed by the following mathematical expression (E3), a maximum allowable tolerance $\delta_{12}$ of the ideal value $\Delta\theta_{\alpha\beta 1}$ of the difference $\Delta\theta_{\alpha\beta}$ can be obtained from the mathematical expressions (E1) and (E2).

$$\delta_{12} = \delta_1 \cdot \lambda_1 - \delta_2 \cdot \lambda_2 \tag{E3}$$

In the present embodiment, as expressed by the following mathematical expression (E4), the absolute value of the maximum allowable tolerance $\delta_{12}$ of the ideal value $\Delta\theta_{\alpha\beta 1}$ of the difference $\Delta\theta_{\alpha\beta}$ is set as the absolute value of each of the upper limit κ and the lower limit −κ.

$$|\delta_{12}| = |\pm\kappa| \tag{E4}$$

As a result, the allowable range $R_{\Delta\alpha\beta}$ of the difference $\Delta\theta_{\alpha\beta}$ is expressed by the following mathematical expression (E5).

$$R_{\Delta\alpha\beta}=\Delta\theta_{\alpha\beta1}\pm\kappa \tag{E5}$$

According to the second embodiment, the following advantageous effects are obtained.

When at least one of the two driven gears 12, 13 is not appropriately rotating for the rotation angle θ of the driving gear 11, the value of the difference $\Delta\theta_{\alpha\beta}$ between the two rotation angles $\theta_\alpha$, $\theta_\beta$, computed by the differential computing unit 36, falls outside the allowable range $R_{\Delta\alpha\beta}$. Therefore, whether the driven gears 12, 13 are appropriately rotating for the rotation angle θ of the driving gear 11 can be determined based on whether the value of the difference $\Delta\theta_{\alpha\beta}$ between the two rotation angles $\theta_\alpha$, $\theta_\beta$, computed by the differential computing unit 36, falls within the allowable range $R_{\Delta\alpha\beta}$. By extension, whether the rotation angle θ of the driving gear 11, computed by the absolute angle computing unit 24, is normal can be determined.

The integrated values $\Sigma_\alpha$, $\Sigma_\beta$ of the rotation amounts Δα, Δβ of the driven gears 12, 13 are converted to the rotation angles $\theta_\alpha$, $\theta_\beta$ of the driving gear 11, and an abnormality of the rotation angle θ of the driving gear 11 is detected based on the converted rotation angles $\theta_\alpha$, $\theta_\beta$. For example, when so-called tooth jumping occurs in meshing between the driving gear 11 and any one of the two driven gears 12, 13, the integrated value $\Sigma_\alpha$ of the rotation amount Δα of the first driven gear 12 and the integrated value $\Sigma_\beta$ of the rotation amount Δβ of the second driven gear 13 significantly deviate from each other. For this reason, there is a high probability that the difference $\Delta\theta_{\alpha\beta}$ between the two rotation angles $\theta_\alpha$, $\theta_\beta$ falls outside the allowable range $R_{\Delta\alpha\beta}$. Therefore, the value of the difference Δαβ significantly falls outside the allowable range associated with the original number of periods $\gamma_1$, so an abnormality, such as a situation that the value of the difference Δαβ falls within an allowable range associated with another number of periods $\gamma_1$ different from the original one, is appropriately detected.

Other Embodiments

The first and second embodiments may be modified as follows.

In the first embodiment, a configuration except for the gradient adjustment unit 21 may be employed as the microcomputer 19. An abnormality of the rotation angle θ of the driving gear 11 is detected through a comparison between the value of the difference between the rotation angle α of the first driven gear 12, detected by the first magnetic sensor 17, and the rotation angle β of the second driven gear 13, detected by the second magnetic sensor 18, and an ideal value of the difference.

In the first embodiment, as indicated by the alternate long and two-short dashed line in FIG. 2, when the abnormality detection unit 25 detects an abnormality of the rotation angle θ of the driving gear 11, the abnormality detection unit 25 may acquire a period number $\gamma_1$ computed by the rotation computing unit 23 and consult the table TB shown in FIG. 8 based on the acquired number of periods $\gamma_1$. With this configuration, the abnormality detection unit 25 learns a period number $\gamma_1$, so the abnormality detection unit 25 is able to further quickly recognize the allowable range of a current value of the difference Δαβ between the gradient-adjusted rotation angle α' and the gradient-adjusted rotation angle β', computed by the differential computing unit 22.

Therefore, the abnormality detection unit 25 is able to further quickly detect an abnormality of the rotation angle θ of the driving gear 11.

In the second embodiment, a configuration including only the abnormality detection unit 26 as a unit that detects an abnormality of the rotation angle θ of the driving gear 11 may be employed as the microcomputer 19. With this configuration as well, an abnormality of the rotation angle θ of the driving gear 11 is detected.

In the second embodiment, when an abnormality of the rotation angle θ of the driving gear 11 due to so-called tooth jumping, or the like, need not be detected depending on product specifications, or the like, a configuration except for the adders 34a, 34b and the integrated value holding units 33a, 33b may be employed as the abnormality detection unit 26 shown in FIG. 10. In this case, the conversion unit 35 converts the rotation amounts Δα, Δβ of the two driven gears 12, 13 to the rotation angles $\theta_\alpha$, $\theta_\beta$ of the driving gear 11. The differential computing unit 36 computes the difference $\Delta\theta_{\alpha\beta}$ between the rotation angles $\theta_\alpha$, $\theta_\beta$ converted by the conversion unit 35. The determination unit 37 detects an abnormality of the rotation angle θ of the driving gear 11 based on whether the value of the difference $\Delta\theta_{\alpha\beta}$ falls within the allowable range set based on the ideal value. An upper limit κ and a lower limit −κ that define the allowable range are set as follows.

An ideal value $\Delta\theta_{\alpha\beta1}$ of the difference $\Delta\theta_{\alpha\beta}$ in this case is expressed by the following mathematical expression (F1). An actual value $\Delta\theta_{\alpha\beta2}$ of the difference $\Delta\theta_{\alpha\beta}$ in this case is expressed by the following mathematical expression (F2).

$$\Delta\theta_{\alpha\beta1}=\Delta\alpha\cdot\lambda_1-\Delta\beta\cdot\lambda_2=0 \tag{F1}$$

$$\Delta\theta_{\alpha\beta2}=(\Delta\alpha+\delta_1)\cdot\lambda_1-(\Delta\beta+\delta_2)\cdot\lambda_2=0 \tag{F2}$$

Therefore, as expressed by the following mathematical expression (F3), a maximum allowable tolerance $\delta_{12}$ of the ideal value $\Delta\theta_{\alpha\beta1}$ of the difference $\Delta\theta_{\alpha\beta}$ can be obtained from the mathematical expressions (F1) and (F2).

$$\delta_{12}=\delta_1\cdot\lambda_1-\delta_2\cdot\lambda_2 \tag{F3}$$

As expressed by the following mathematical expression (F4), the absolute value of the maximum allowable tolerance $\delta_{12}$ of the ideal value $\Delta\theta_{\alpha\beta1}$ of the difference $\Delta\theta_{\alpha\beta}$ is set as the absolute value of each of the upper limit κ and the lower limit −κ.

$$|\delta_{12}|=|\pm\kappa| \tag{F4}$$

In the first and second embodiments, the driving gear 11, the first driven gear 12, and the second driven gear 13 may be made of a metal material.

In the first and second embodiments, the rotation computing unit 23 may compute a period number $\gamma_2$ of the second driven gear 13 based on the value of the difference Δαβ, computed by the differential computing unit 22. In this case, as the table TB, the one that defines the relationship between a difference Δαβ and a period number $\gamma_2$ of the second driven gear 13 is employed. When the configuration that a period number $\gamma_2$ of the second driven gear 13 is computed by the rotation computing unit 23 is employed, the absolute angle computing unit 24 computes the rotation angle θ of multiple revolutions, exceeding 360°, of the driving gear 11 in absolute value based on the rotation angle β of the second driven gear 13, detected by the second magnetic sensor 18, and the period number $\gamma_2$ of the second driven gear 13, computed by the rotation computing unit 23. With this configuration as well, the rotation angle θ of the driving gear 11, that is, the absolute rotation angle of the shaft 14, is detected immediately.

In the first and second embodiments, a Hall sensor, a resolver, or the like, may be employed as each of the magnetic sensors 17, 18 that detect the rotation angles α, β of the two driven gears 12, 13. Alternatively, an optical sensor may be employed as each of sensors that detect the rotation angles α, β of the two driven gears 12, 13.

In the first and second embodiments, the rotation angle α of the first driven gear 12 and the rotation angle β of the second driven gear 13 may be computed by the microcomputer 19, specifically, the absolute angle computing unit 24.

In the first and second embodiments, examples of the shaft 14 include a steering shaft that rotates in synchronization with operation of a steering wheel and a pinion shaft that makes up a rack and pinion mechanism in a steering system for a vehicle. The rotation angle detection apparatus 10 is suitable for applications to detecting rotation angles of shafts of various machines other than the steering system for a vehicle.

What is claimed is:

1. A rotation angle detection apparatus comprising:
   a driving gear configured to rotate integrally with a component whose rotation is to be detected;
   two driven gears having different numbers of teeth, each of the driven gears being in mesh with the driving gear;
   two sensors each configured to detect a rotation angle of an associated one of the two driven gears; and
   an arithmetic circuit configured to compute a rotation angle of the driving gear based on the rotation angles of the two driven gears, detected through the two sensors, the arithmetic circuit being configured to detect an abnormality in the rotation angle of the driving gear when a relationship between the rotation angles of the two driven gears as detected through the two sensors is different from a relationship when a rotation angle of the driving gear as computed by the arithmetic circuit is normal,
   the arithmetic circuit is configured to detect an abnormality in the rotation angle of the driving gear based on a difference between integrated values of rotation amounts of the two driven gears, computed as a value indicating the relationship between the rotation angles of the two driven gears, and an ideal difference between the integrated values of the rotation amounts of the two driven gears.

2. The rotation angle detection apparatus according to claim 1, wherein the component whose rotation is to be detected is one of a steering shaft and a pinion shaft in a steering system of a vehicle.

* * * * *